United States Patent [19]
Kamachi

[11] Patent Number: 5,678,181
[45] Date of Patent: Oct. 14, 1997

[54] MOBILE RADIO COMMUNICATION SYSTEM CAPABLE OF AVOIDING AN INTERFERENCE DUE TO COLLISION OF RADIO SIGNALS AND APPARATUSES USED THEREIN

[75] Inventor: Ken'ichiro Kamachi, Tokyo, Japan

[73] Assignee: NEC Corporation, Japan

[21] Appl. No.: 489,031

[22] Filed: Jun. 9, 1995

[51] Int. Cl.$^6$ .................................................. H04Q 7/00
[52] U.S. Cl. .................. 455/33.1; 455/63; 455/54.1; 455/56.1
[58] Field of Search ........................ 455/33.1, 33.4, 455/54.1, 56.1, 62, 63, 89

[56] References Cited

U.S. PATENT DOCUMENTS

| | | | |
|---|---|---|---|
| 5,491,741 | 2/1996 | Farwell et al. | 455/63 |
| 5,497,505 | 3/1996 | Koohgoli et al. | 455/63 |
| 5,581,804 | 12/1996 | Cameron et al. | 455/63 |

FOREIGN PATENT DOCUMENTS

| | | |
|---|---|---|
| 63-258127 | 10/1988 | Japan . |
| 64-48533 | 2/1989 | Japan . |

*Primary Examiner*—Reinhard J. Eisenzopf
*Assistant Examiner*—Marsha D. Banks-Harold
*Attorney, Agent, or Firm*—Ostrolenk, Faber, Gerb & Soffen, LLP

[57] ABSTRACT

In a system comprising a first base station (B1) assigned with a control channel frequency, a counterpart mobile station (P1) of the first base station, and a second base station (B2) adjacent to the first base station and assigned with the control channel frequency, the first base station comprises a control information transmitting portion (1, 5) for intermittently transmitting control information signals through the control channel frequency to the counterpart mobile station with a time duration left between two adjacent ones of the control information signals. A time duration determining portion (2, 14) randomly determines a following time duration between current and following control information signals so that the following time duration randomly varies from a previous time duration previously determined between the current and previous control information signals. A transmission control portion (12) controls the control information transmitting portion to transmit the current control information signal through the control channel frequency to the counterpart mobile station with the following time duration inserted in the current control information signal. The counterpart mobile station comprises a control information receiving portion (3) for selectively receiving the current control information signal and the following time duration inserted in the current control information signal through the control channel frequency in accordance with the previous time duration previously received with the previous time duration included in the previous control information signal.

4 Claims, 5 Drawing Sheets

MOBILE RADIO COMMUNICATION SYSTEM CAPABLE OF AVOIDING AN INTERFERENCE DUE TO COLLISION OF RADIO SIGNALS AND APPARATUSES USED THEREIN

BACKGROUND OF THE INVENTION

This invention relates to a mobile radio communication system, such as a radio paging system and a mobile telephone system, in which a base station produces a radio signal to call a mobile station as a counterpart station to communicate with the base station. More particularly, this invention relates to a technique of avoiding a radio interference between adjacent base stations assigned to adjacent service zones and assigned with a control channel frequency in common.

As will later be described, a conventional mobile radio communication system is incapable of avoiding occurrence of a reception failure of a control information signal due to a radio interference between adjacent service zones.

SUMMARY OF THE INVENTION

It is therefore an object of this invention to provide a mobile radio communication system which is capable of avoiding occurrence of a reception failure of a control information signal due to a radio interference between adjacent service zones and which is still capable of carrying out an intermittent reception of the control information signal in a mobile station.

It is another object of this invention to provide a base station apparatus and a mobile station apparatus for use in a mobile radio communication system of the type described.

Other objects of this invention will become clear as the description proceeds.

A mobile radio communication system to which this invention is applicable comprises first base station assigned to a first service zone, a counterpart mobile station present within the first service zone to communicate with the first base station, and a second base station assigned to a second service zone adjacent to the first service zone. The first and the second base stations are assigned with a control channel frequency in common.

According to this invention, the first base station comprises: control information transmitting means for intermittently transmitting control information signals by the use of the control channel frequency to the counterpart mobile station with a time duration left between two adjacent ones of the control information signals; time duration determining means for randomly determining, as a following time duration, the time duration between a current one of the control information signals and a following one of the control information signals so that the following time duration randomly varies from a previous time duration which is previously determined between the current one of the control information signals and a previous one of the control information signals by the time duration determining means, the following one of the control information signals following the current one of the control information signals, the previous one of the control information signals preceding the current one of the control information signals; and transmission control means connected to the time duration determining means and the control information transmitting means for controlling the control information transmitting means so that the control information transmitting means transmits the current one of the control information signals by the use of the control channel frequency to the counterpart mobile station with the following time duration inserted in the current one of the control information signals after the control information transmitting means transmits the previous one of the control information signals by the use of the control channel frequency to the counterpart mobile station with the previous time duration inserted in the previous one of the control information signals. The counterpart mobile station comprises: control information receiving means for selectively receiving the current one of the control information signals and the following time duration inserted in the current one of the control information signals by the use of the control channel frequency in accordance with the previous time duration which is inserted in the previous one of the control information signals and which is previously and selectively received by the control information receiving means.

A mobile radio communication system to which this invention is applicable comprises first and second base stations assigned to first and second service zones adjacent to each other and first and second mobile stations present within the first and the second service zones as counterpart mobile stations of the first and the second base stations to communicate with the first and the second base stations, respectively. The first and the second base stations are assigned with a control channel frequency in common.

According to this invention, each of the first and the second base stations comprises: control information transmitting means for intermittently transmitting control information signals by the use of the control channel frequency to the counterpart mobile station of each of the first and the second base stations with a time duration left between two adjacent ones of the control information signals; time duration determining means for randomly determining, as a following time duration, the time duration between a current one of the control information signals and a following one of the control information signals so that the following time duration randomly varies from a previous time duration which is previously determined between the current one of the control information signals and a previous one of the control information signals by the time duration determining means, the following one of the control information signals following the current one of the control information signals, the previous one of the control information signals preceding the current one of the control information signals; and transmission control means connected to the time duration determining means and the control information transmitting means for controlling the control information transmitting means so that the control information transmitting means transmits the current one of the control information signals by the use of the control channel frequency to the counterpart mobile station of each of the first and the second base stations with the following time duration inserted in the current one of the control information signals after the control information transmitting means transmits the previous one of the control information signals by the use of the control channel frequency to the counterpart mobile station of each of the first and the second base stations with the previous time duration inserted in the previous one of the control information signals. The counterpart mobile station of each of the first and the second base stations comprises: control information receiving means for selectively receiving the current one of the control information signals and the following time duration inserted in the current one of the control information signals by the use of the control channel frequency in accordance with the previous time duration which is inserted in the previous one of the control information signals and which is previously and selectively received by the control information receiving means.

A base station apparatus to which this invention is applicable is for use in each of first and second base stations of a mobile radio communication system in which the first and the second base stations assigned to first and second service zones adjacent to each other and which comprises first and second mobile stations present within the first and the second service zones as counterpart mobile stations of the first and the second base stations to communicate with the first and the second base stations, respectively. The first and the second base stations are assigned with a control channel frequency in common.

According to this invention, the base station apparatus comprises: control information transmitting means for intermittently transmitting control information signals by the use of the control channel frequency to the counterpart mobile station of each of the first and the second base stations with a time duration left between two adjacent ones of the control information signals; time duration determining means for randomly determining, as a following time duration, the time duration between a current one of the control information signals and a following one of the control information signals so that the following time duration randomly varies from a previous time duration which is previously determined between the current one of the control information signals and a previous one of the control information signals by the time duration determining means, the following one of the control information signals following the current one of the control information signals, the previous one of the control information signals preceding the current one of the control information signals; and transmission control means connected to the time duration determining means and the control information transmitting means for controlling the control information transmitting means so that the control information transmitting means transmits the current one of the control information signals by the use of the control channel frequency to the counterpart mobile station of each of the first and the second base stations with the following time duration inserted in the current one of the control information signals after the control information transmitting means transmits the previous one of the control information signals by the use of the control channel frequency to the counterpart mobile station of each of the first and the second base stations with the previous time duration inserted in the previous one of the control information signals. The base station apparatus thereby makes the counterpart mobile station of each of the first and the second base stations selectively receive the current one of the control information signals and the following time duration inserted in the current one of the control information signals by the use of the control channel frequency in accordance with the previous time duration which is inserted in the previous one of the control information signals and which is previously and selectively received by the counterpart mobile station of each of the first and the second base stations.

A mobile station apparatus to which this invention is applicable is for use in each of first and second mobile stations of a mobile radio communication system comprising first and second base stations assigned to first and second service zones adjacent to each other. The first and the second mobile stations are present within the first and the second service zones as counterpart mobile stations of the first and the second base stations to communicate with the first and the second base stations, respectively. The first and the second base stations are assigned with a control channel frequency in common.

According to this invention, each of the first and the second base stations comprises: control information transmitting means for intermittently transmitting control information signals by the use of the control channel frequency to the counterpart mobile station of each of the first and the second base stations with a time duration left between two adjacent ones of the control information signals; time duration determining means for randomly determining, as a following time duration, the time duration between a current one of the control information signals and a following one of the control information signals so that the following time duration randomly varies from a previous time duration which is previously determined between the current one of the control information signals and a previous one of the control information signals by the time duration determining means, the following one of the control information signals following the current one of the control information signals, the previous one of the control information signals preceding the current one of the control information signals; and transmission control means connected to the time duration determining means and the control information transmitting means for controlling the control information transmitting means so that the control information transmitting means transmits the current one of the control information signals by the use of the control channel frequency to the counterpart mobile station of each of the first and the second base stations with the following time duration inserted in the current one of the control information signals after the control information transmitting means transmits the previous one of the control information signals by the use of the control channel frequency to the counterpart mobile station of each of the first and the second base stations with the previous time duration inserted in the previous one of the control information signals.

According to this invention, the mobile station apparatus for use in the counterpart mobile station of each of the first and the second base stations comprises: control information receiving means for selectively receiving the current one of the control information signals and the following time duration inserted in the current one of the control information signals by the use of the control channel frequency in accordance with the previous time duration which is inserted in the previous one of the control information signals and which is previously and selectively received by the control information receiving means, the control information receiving means producing the current one of the control information signals except the following time duration after the control information receiving means produces the previous one of the control information signals except the previous following time duration; and operation control means connected to the control information receiving means for controlling operation of the mobile station apparatus in response to the current one of the control information signals except the following time duration after the operation control means controls operation of the mobile station apparatus in response to the previous one of the control information signals except the previous following time duration.

Japanese Patent Unexamined patent Publications Nos. 63-258127 (namely, 258127/1988) and 64-48533 (namely, 48533/1989) disclose methods of avoiding an interference. However, either method uses a constant transmission period of the control information signals and is therefore different from this invention utilizing a variable transmission period of the control information signals.

DESCRIPTION OF PREFERRED EMBODIMENTS

Figure 1:
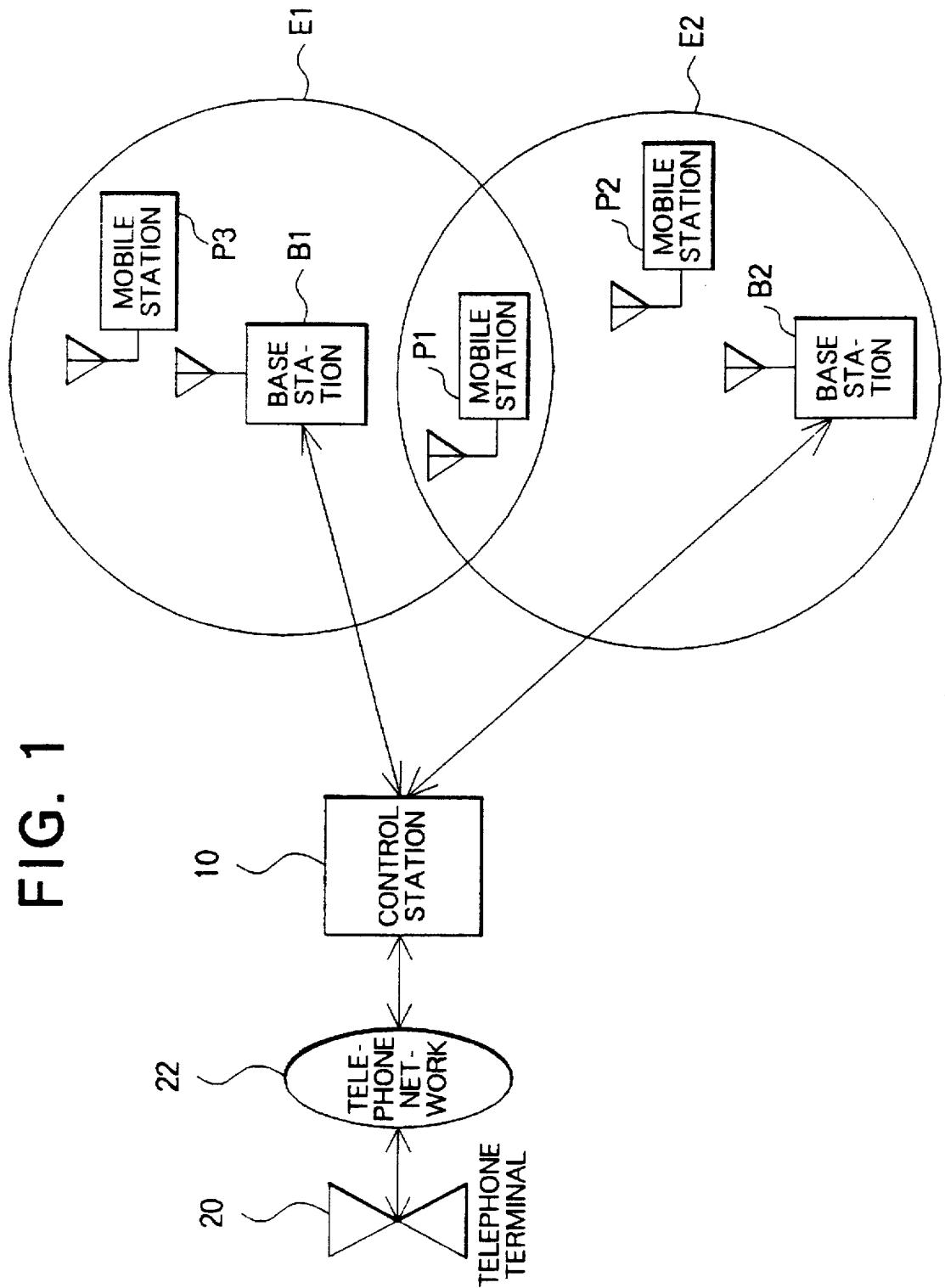
FIG. 1 is a block diagram for use in describing a structure of each of a conventional mobile radio communication system and a mobile radio communication system according to this invention.

Referring to FIG. 1, a conventional mobile radio communication system will be described at first for a better understanding of this invention. The mobile radio communication system comprises a plurality of service or radio zones. For convenience of illustration, two service or radio zones are shown in the figure as a first service or radio zone E1 and a second service or radio zone E2. The first and the second service zones E1 and E2 are adjacent to each other. First and second base stations B1 and B2 are assigned to the first and the second radio zones E1 and E2 and connected to a telephone terminal 20 though a control station 10 and a telephone network 22 in the manner known in the art.

First through third mobile stations P1 through P3 are movable throughout the first and the second radio zones E1 and E2. Through at least one common controlling physical channel, control information signals are transmitted from the first and the second base stations B1 and B2 to the first through the third mobile stations P1 through P3. At this time, information carried on the controlling physical channel from the first and the second base stations B1 and B2 to the first through the third mobile stations P1 through P3 has a frame structure comprising a combination of a plurality of frames. Specifically, the control information signals are dispersively accommodated in a plurality of frames which are intermittently inserted in a sequence of other ordinary frames. Such a structure is called a superframe structure. An entire length of the superframe structure from a start or a leading edge to an end or a trailing edge is collectively referred to as a superframe.

Figure 2:
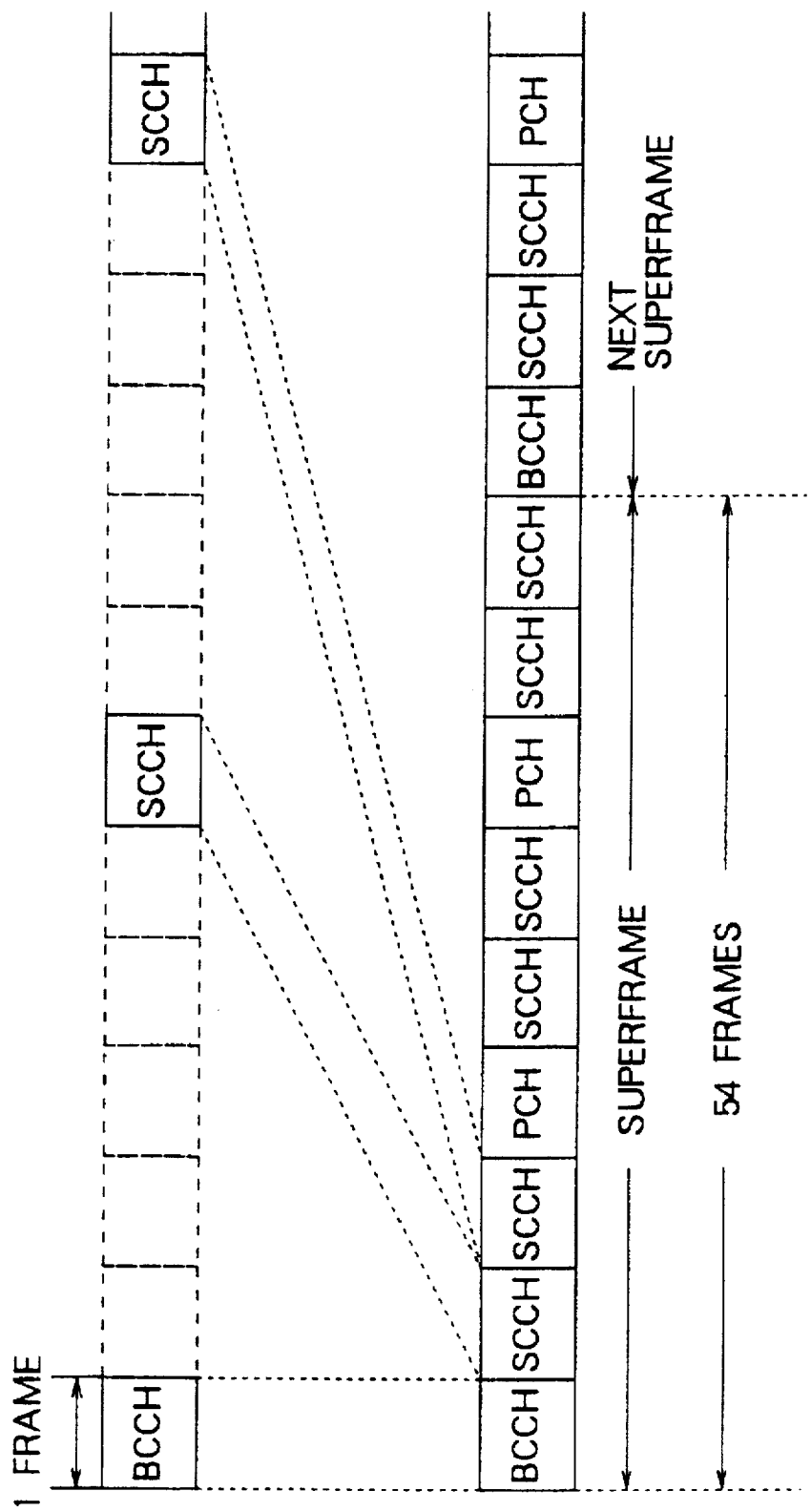
FIG. 2 shows a structure of a superframe used in the conventional mobile radio communication system.

Referring to FIG. 2, a structure of the superframe will be described. Each of the first and the second base stations B1 and B2 has a superframe transmission period which is invariable. Each frame in the superframe is assigned with one of a broadcasting channel BCCH, a paging channel PCH (simultaneous calling channel) PCH, and a selective access channel SCCH. A single superframe has a length of fifty-four frames. Each of the first and the second base stations B1 and B2 transmits at every six frames one of those frames including the control information signals.

It is therefore possible to transmit the control information signals corresponding to nine frames in the above-mentioned fifty-four frames. In FIG. 2, the superframe comprises a sequence of a single frame for the broadcasting channel BCCH, two frames for the selective access channel SCCH, a single frame for the paging channel PCH, two frames for the selective access channel SCCH, a single frame for the paging channel PCH, and two frames for the selective access channel. The broadcasting channel BCCH is located at a fixed position in the superframe and carries channel structure information, position registration information, and the like. In a second row of FIG. 2, although a time interval of five frames is practically present between two adjacent channels, the time interval of five frames is omitted for simplifying the figure.

The first and the second base stations B1 and B2 may have superframe transmission periods different from each other. As regards an individual one of the first and the second base stations B1 and B2, the broadcasting channel BCCH is transmitted at a constant period (fifty-four frames in FIG. 2) which is invariable.

In the above-described technique of transmitting and receiving the control information signal, one base station transmits the broadcasting channel at the constant period. Once transmission is started, the period can not be varied. It is assumed here that two adjacent or overlapping radio zones have superframe transmission periods identical with each other and that superframe start positions are coincident with each other. In this event, the broadcasting channels from those radio zones interfere with each other. Therefore, the mobile station can not receive any one of the broadcasting channels from the two radio zones. Furthermore, such a condition is continued. As a result, in an area where the two broadcasting channels interfere, communication is impossible because the mobile station can not recognize a structure of the physical channel for radio control.

Such a problem will be avoided if operation of each of the base stations having a possibility of interference of the broadcasting channels is preliminarily adjusted so that the base stations transmit the broadcasting channels at timings which are not coincident with each other. Attention will herein be directed to a second-generation cordless telephone system for example. In the cordless telephone system, an air interface from the base station to the mobile station is common in a domestic use, an office use, and a public use. There may be a case where a domestic base station is adjacent to a particular public base station or where two domestic base stations are adjacent to each other. It is therefore difficult to perform preliminary adjustment so that the two base stations transmit the broadcasting channels at transmission timings which are not coincident with each other.

Alternatively, a proposal is made to make each base station transmit the broadcasting channel at a random transmission period. In this case, even if the broadcasting channels from the adjacent base stations collide with each other to cause an interference to occur, next superframes or subsequent superframes have a little probability of collision of the broadcasting channels and a resultant interference. Thus, the above-mentioned problem is effectively avoided. However, the mobile station must continuously receive the broadcasting channel because a start position of the next superframe is not predicted. This results in an increase of power consumption in the mobile station.

This invention provides a mobile radio communication system which is capable of avoiding occurrence of a reception failure of a control information signal due to a radio interference between adjacent service or radio zones by making each base station randomly determine a superframe start position and which is still capable of carrying out an intermittent reception of the control information signal in a mobile station.

As will latter be described, a feature of this invention, the base station randomly varies a transmission timing for the control information signals to produce a variation schedule and informs the variation schedule as a content of the control information signal. The mobile station varies a reception timing for the control information signal in accordance with the variation schedule transmitted from the base station to which the mobile station belongs.

The control information signals form a superframe structure having a frame period comprising first through n-th consecutive frames containing first through m-th effective frames. When a leading frame of the superframe structure is defined as a broadcasting channel, the variation schedule is preferably inserted into the broadcasting channel. Alternatively, the variation schedule is inserted into a paging channel contained in the superframe structure.

In accordance with a numerical value supplied from random value producing circuit contained in the base station, a next transmission start position (next superframe start position) for a next control information signal is determined as next transmission start position information. The next transmission start position information is inserted into a current control signal and transmitted to the mobile station. Transmission of subsequent control information signals is carried out in the similar manner. Alternatively, transmission start position information indicative of transmission start positions for a plurality of subsequent control signals is inserted into the current control signal currently transmitted.

For example, the control information signal comprises a broadcasting channel indicative of a leading edge of a frame signal including a control signal, a paging channel, and a selective access channel. The next transmission start position information is preferably inserted into the broadcasting channel. Alternatively, the next transmission start position information may be inserted into the paging channel. The mobile station receives the next superframe start position information inserted into the broadcasting channel or the paging channel. Thus, the mobile station is enabled to carry out an intermittent reception.

The next transmission start position information may be inserted into both the broadcasting channel and the paging channel. In this event, even if the broadcasting channel is not received due to collision with the broadcasting channel from the adjacent base station, the next transmission start position information reaches the mobile station once the paging channel is received.

As described, each base station randomly determines the superframe start position. Accordingly, it is possible to avoid occurrence a reception failure for the control signal due to an interference between adjacent radio zones and to carry out an intermittent reception at the mobile station.

Figure 3:
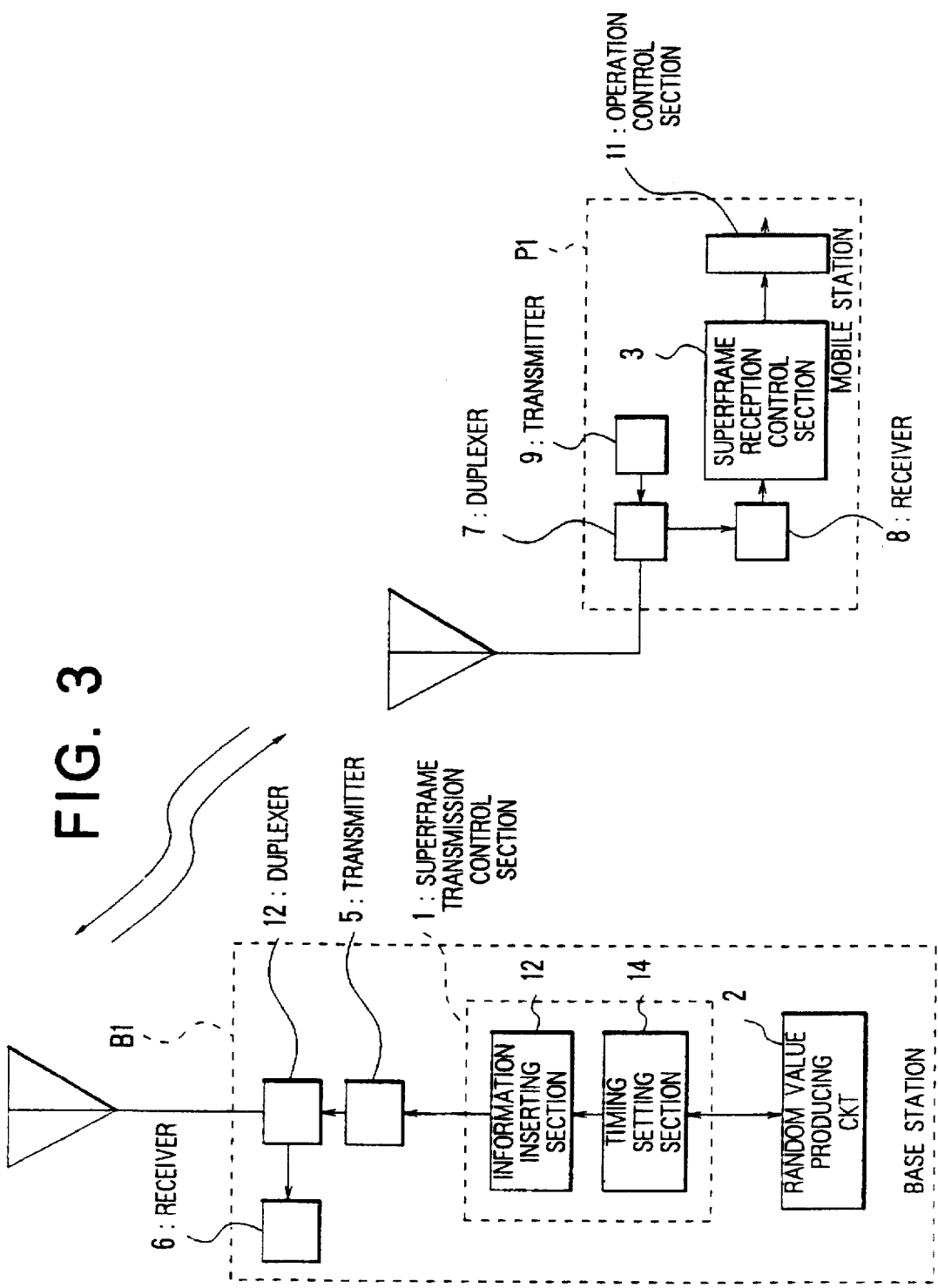
FIG. 3 is a block diagram of a base station and a mobile station for use in a mobile radio communication system according to a first embodiment of this invention.

Turning to FIG. 3 with reference to FIG. 1, a mobile radio communication system according to a first embodiment of this invention comprises first and second base stations B1 and B2 assigned to first and second service zones E1 and E2 adjacent to each other and first and second mobile stations P1 and P2 which are present within the first and the second service zones E1 and E2 as counterpart mobile stations of the first and the second base stations B1 and B2 to communicate with the first and the second base stations B1 and B2, respectively. The first and the second base stations P1 and P2 are assigned with a control channel frequency in common. The first and the second base stations B1 and B2 are similar in structure to each other. The first and the second mobile stations P1 and P2 are similar in structure to each other.

The base station B1 comprises a superframe transmission control section 1 for intermittently transmitting the control information signals to the mobile station P1 through a transmitter 5 and an antenna duplexer 4 by the use of the control channel frequency to communicate with the base station B1. The base station B1 further comprises a receiver 6 for receiving a communication signal through the antenna duplexer 4. The mobile station P1 comprises a superframe reception control section 3 for receiving the control information signals through a antenna duplexer 7 and a receiver 8 during a communication standby state. The mobile station P1 further comprises a transmitter 9 for transmitting the communication signal through the antenna duplexer 7 to the base station B1.

The base station B1 comprises a random value producing circuit 2 which serves as a section for randomly varying a transmission timing for the control information signals to produce a variation schedule indicative of a random value produced by the random value producing circuit 2. The base station B1 further comprises, in the superframe transmission control section 1, a timing setting section 14 and an information inserting section 12 which in combination serve as a section for informing the variation schedule as a content of the control information signal. On the other hand, the mobile station P1 comprises, in the superframe reception control section 3, a function for varying a reception timing for the control information in accordance with the variation schedule transmitted from the base station B1 to which the mobile station P1 belongs.

The control information signals has a superframe structure having a frame period comprising first through fifty-fourth consecutive frames containing first through ninth effective frames. When a leading frame of the superframe structure is defined as a broadcasting channel BCCH, the variation schedule is inserted into the broadcasting channel BCCH.

Figure 4:
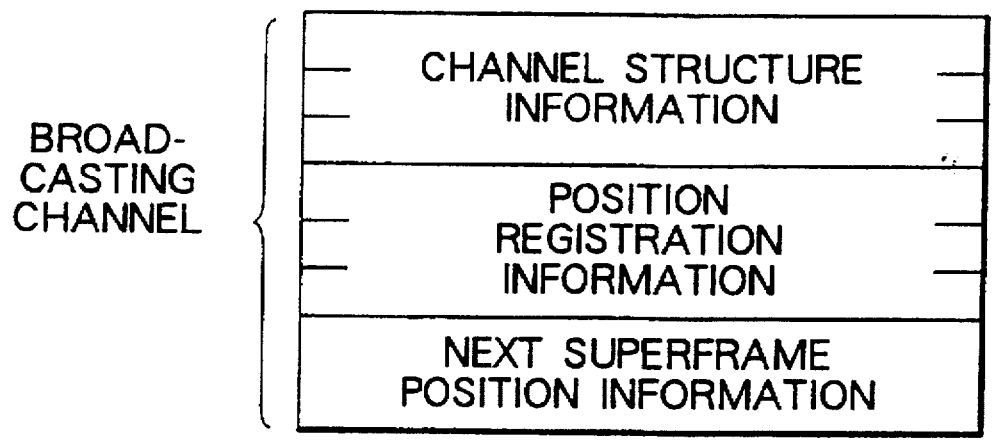
FIG. 4 shows a structure of a broadcasting channel used in the mobile radio communication system according to the first embodiment of this invention.
Figure 5:
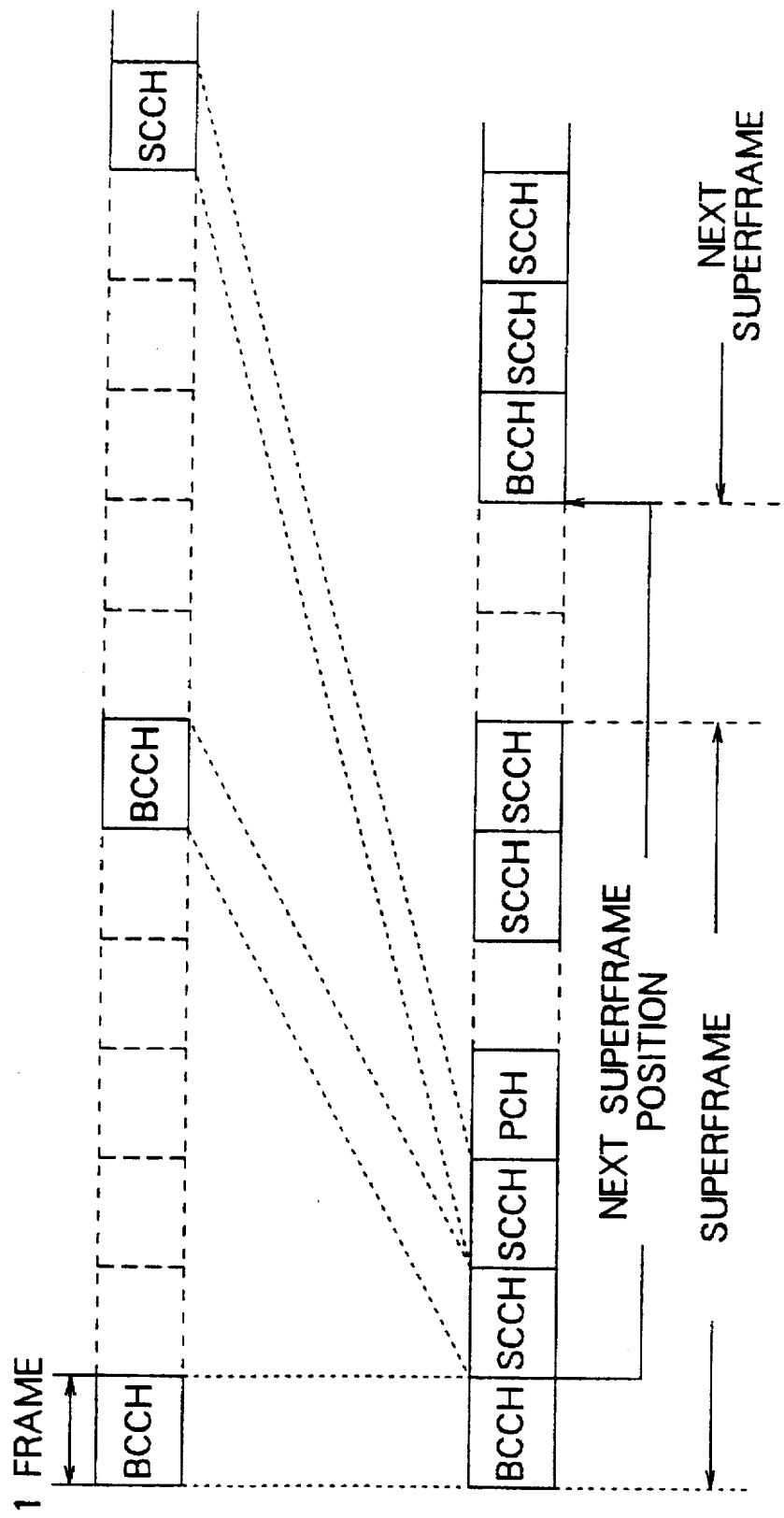
FIG. 5 shows a whole structure of a superframe used in the mobile radio communication system according to the first embodiment of this invention.

Next referring to FIGS. 4 and 5, description will proceed to the superframe structure. FIG. 4 shows a structure of the broadcasting channel BCCH. FIG. 5 shows a whole structure of the superframe. In a second row of FIG. 5, although a time duration of five frames is practically exists between two adjacent channels, the time duration is omitted for simplifying the figure. In. FIG. 4, the broadcasting channel BCCH contains channel structure information, position registration information, and next superframe position information as information elements. The channel structure information and the position registration information are known in the art. The next superframe position information has a value given by a random value produced by the random value producing circuit 2 in the base station B1. The random value is produced at every superframe. In accordance with the random value, the base station B1 determines a position of transmission of a next superframe. Accordingly, even in occurrence of a collision of the broadcasting channels BCCH transmitted from the adjacent base stations B1 and B2 and a resultant interference, next or subsequent superframes have little or ignorable probability of the collision and the interference.

The next superframe position information contained in the broadcasting channel BCCH serves as a pointer indicative of the position of the next superframe. When the mobile station P1 receives the broadcasting channel BCCH, the position of the broadcasting channel BCCH in the next superframe is known. Likewise, when the mobile station P1 receives the broadcasting channel BCCH in the next superframe, the position of the broadcasting channel in the superframe following the next superframe is known. Accordingly, it is unnecessary for the mobile station P1 to continuously receive the physical channel for radio control in order to receive the broadcasting channel BCCH. It is sufficient to carry out a receiving operation at every position of transmission of the broadcasting channel BCCH.

It is assumed here that a collision of the broadcasting channels BCCH from the adjacent base stations B1 and B2 occurs at the next superframes. Thereafter, the mobile station P1 continuously receives the physical channel for radio control because the position of the superframe following the next superframe is not known. When the broadcasting channel BCCH at the leading edge of the superframe following the next superframe is received, the mobile station P1 returns to an intermittent reception mode. Thus, the mobile station P1 must continuously receive the physical channel for radio control for a certain time duration. If the positions of the next superframe and the superframe following the next superframe are contained in the broadcasting channel BCCH, it is possible to reduce the time duration for which the mobile station P1 continuously receives the physical channel for radio control.

If a combination of the positions of the next superframe, the superframe following the next superframe, and the subsequent superframe subsequent thereto is contained in the broadcasting channel BCCH, it is possible to further reduce the time duration for which the mobile station P1 continuously receives the physical channel for radio control.

Figure 6:
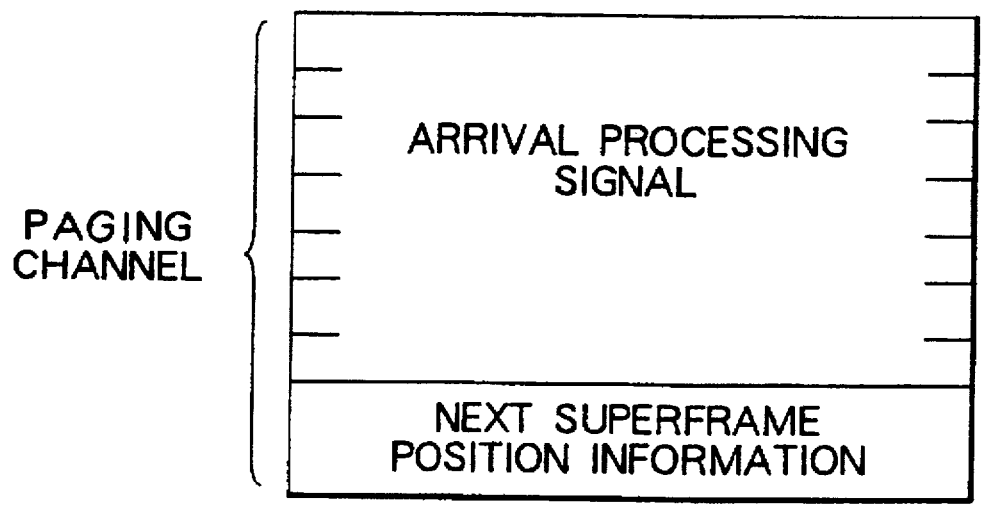
FIG. 6 shows a structure of a paging channel used in a mobile radio communication system according to a second embodiment of this invention.

Next referring to FIG. 6, a mobile radio communication system according to a second embodiment of this invention will be described. FIG. 6 shows a structure of a paging channel PCH. The paging channel contains as information elements an arrival processing signal and a next superframe position information. In this second embodiment, the information elements of the broadcasting channel BCCH, the structure of the superframe, and the manner of determination of the value of the next superframe position information contained in the broadcasting channel BCCH are similar to those of the first embodiment and will not be described any longer. The value of the next superframe position information contained in the paging channel PCH is determined at the same random value as that of the next superframe position information contained in the broadcasting channel BCCH of the same superframe. When the mobile station P1 receives the broadcasting channel BCCH, the channel structure information is given. As a consequence, the mobile station P1 recognizes the position at which the paging channel PCH to be received is present in the superframe. When the paging channel PCH is received, the position of the paging channel PCH in the next superframe is known from the next superframe position information contained in the paging channel PCH. Accordingly, irrespective of random variation of a superframe transmission period, the mobile station P1 is not required to continuously receive the physical channel for radio control as far as the paging channel PCH is received. It is sufficient to carry out a receiving operation at every position of transmission of the paging channel PCH.

It is assumed here that a collision of the broadcasting channels BCCH and the paging channels PCH from the adjacent base stations B1 and B2 occurs at the next superframes. Thereafter, the mobile station P1 continuously receives the physical channel for radio control because the position of the superframe following the next superframe is not known. When the broadcasting channel BCCH or the paging channel PCH in the superframe following the next superframe is received, the mobile station P1 returns to an intermittent reception mode. Thus, the mobile station P1 must continuously receive the physical channel for radio control for a certain time duration. If the positions of the next superframe and the superframe following the next superframe are contained in the paging channel PCH, it is possible to reduce the time duration for which the mobile station P1 continuously receives the physical channel for radio control.

If a combination of the positions of the next superframe, the superframe following the next superframe, and the subsequent superframe subsequent thereto is contained in the paging channel PCH, it is possible to further reduce the time duration for which the mobile station P1 continuously receives the physical channel for radio control.

As described, according to this invention, each base station randomly determines the superframe start position. Thus, it is possible to avoid occurrence of a reception failure of the control signal due to an interference between the adjacent radio zones and to carry out an intermittent reception at the mobile station.

Summarizing in FIGS. 1, 3, and 5, the first base stations B1 comprises a control information transmitting portion (1, 5) for intermittently transmitting control information signals (that is, the superframes of FIG. 5) by the use of the control channel frequency to the counterpart mobile station P1 of the first base station B1 with a time duration left between two adjacent ones of the control information signals. The first base station B1 further comprises a time duration determining portion (2, 14) for randomly determining, as a following time duration, the time duration between a current one of the control information signals and a following one of the control information signals so that the following time duration randomly varies from a previous time duration which is previously determined between the current one of the control information signals and a previous one of the control information signals by the time duration determining portion. The following one of the control information signals follows the current one of the control information signals. The previous one of the control information signals precedes the current one of the control information signals. The first base station B1 still further comprises a transmission control portion (12) connected to the time duration determining portion and the control information transmitting portion for controlling the control information transmitting portion so that the control information transmitting portion transmits the current one of the control information signals by the use of the control channel frequency to the counterpart mobile station P1 with the following time duration inserted in the current one of the control information signals after the control information transmitting means transmits the previous one of the control information signals by the use of the control channel frequency to the counterpart mobile station P1 with the previous time duration inserted in the previous one of the control information signals.

The counterpart mobile station P1 comprises a control information receiving portion (3) for selectively receiving the current one of the control information signals and the following time duration inserted in the current one of the control information signals by the use of the control channel frequency in accordance with the previous time duration which is inserted in the previous one of the control information signals and which is previously and selectively received by the control information receiving portion. The counterpart mobile station P1 further comprises an operation control section 11 connected to the control information receiving portion (3) for controlling operation of the counterpart mobile station P1 in response to the current one of the control information signals except the following time duration after the operation control section 11 controls operation of the counterpart mobile station P1 in response to the previous one of the control information signals except the previous following time duration.

What is claimed is:

1. A mobile radio communication system comprising first base station assigned to a first service zone, a counterpart mobile station present within said first service zone to communicate with said first base station, and a second base station assigned to a second service zone adjacent to said first service zone, said first and said second base stations being assigned with a control channel frequency in common, wherein:

said first base station comprises:

control information transmitting means for intermittently transmitting control information signals by the use of said control channel frequency to said counterpart mobile station with a time duration left between two adjacent ones of said control information signals;

time duration determining means for randomly determining, as a following time duration, the time duration between a current one of said control information signals and a following one of said control information signals so that said following time duration randomly varies from a previous time duration which is previously determined between said current one of the control information signals and a previous one of said control information signals by said time duration determining means, said following one of the control information signals following said current one of the control information signals, said previous one of the control information signals preceding said current one of the control information signals; and transmission control means connected to said time duration determining means and said control information transmitting means for controlling said control information transmitting means so that said control information transmitting means transmits said current one of the control information signals by the use of said control channel frequency to said counterpart mobile station with said following time duration inserted in said current one of the control information signals after said control information transmitting means transmits said previous one of the control information signals by the use of said control channel frequency to said counterpart mobile station with said previous time duration inserted in said previous one of the control information signals;

said counterpart mobile station comprising:

control information receiving means for selectively receiving said current one of the control information signals and said following time duration inserted in said current one of the control information signals by the use of the control channel frequency in accordance with said previous time duration which is inserted in said previous one of the control information signals and which is previously and selectively received by said control information receiving means.

2. A mobile radio communication system comprising first and second base stations assigned to first and second service zones adjacent to each other and first and second mobile stations present within said first and said second service zones as counterpart mobile stations of said first and said second base stations to communicate with said first and said second base stations, respectively, said first and said second base stations being assigned with a control channel frequency in common, wherein:

each of said first and said second base stations comprises:
control information transmitting means for intermittently transmitting control information signals by the use of said control channel frequency to the counterpart mobile station of each of said first and said second base stations with a time duration left between two adjacent ones of said control information signals;

time duration determining means for randomly determining, as a following time duration, the time duration between a current one of said control information signals and a following one of said control information signals so that said following time duration randomly varies from a previous time duration which is previously determined between said current one of the control information signals and a previous one of said control information signals by said time duration determining means, said following one of the control information signals following said current one of the control information signals, said previous one of the control information signals preceding said current one of the control information signals; and transmission control means connected to said time duration determining means and said control information transmitting means for controlling said control information transmitting means so that said control information transmitting means transmits said current one of the control information signals by the use of said control channel frequency to the counterpart mobile station of each of said first and said second base stations with said following time duration inserted in said current one of the control information signals after said control information transmitting means transmits said previous one of the control information signals by the use of said control channel frequency to the counterpart mobile station of each of said first and said second base stations with said previous time duration inserted in said previous one of the control information signals;

the counterpart mobile station of each of said first and said second base stations comprising:

control information receiving means for selectively receiving said current one of the control information signals and said following time duration inserted in said current one of the control information signals by the use of the control channel frequency in accordance with said previous time duration which is inserted in said previous one of the control information signals and which is previously and selectively received by said control information receiving means.

3. A base station apparatus for use in each of first and second base stations of a mobile radio communication system in which said first and said second base stations assigned to first and second service zones adjacent to each other and which comprises first and second mobile stations present within said first and said second service zones as counterpart mobile stations of said first and said second base stations to communicate with said first and said second base stations, respectively, said first and said second base stations being assigned with a control channel frequency in common, said base station apparatus comprising:

control information transmitting means for intermittently transmitting control information signals by the use of said control channel frequency to the counterpart mobile station of each of said first and said second base stations with a time duration left between two adjacent ones of said control information signals;

time duration determining means for randomly determining, as a following time duration, the time duration between a current one of said control information signals and a following one of said control information signals so that said following time duration randomly varies from a previous time duration which is previously determined between said current one of the control information signals and a previous one of said control information signals by said time duration determining means, said following one of the control information signals following said current one of the control information signals, said previous one of the control information signals preceding said current one of the control information signals; and transmission control means connected to said time duration determining means and said control information transmitting means for controlling said control information transmitting means so that said control information transmitting means transmits said current one of the control information signals by the use of said control channel frequency to the counterpart mobile station of each of said first and said second base stations with said following time duration inserted in said current one of the control information signals after said control information transmitting means transmits said previous one of the control information signals by the use of said control channel frequency to the counterpart mobile station of each of said first and said second base stations with said previous time duration inserted in said previous one of the control information signals;

said base station apparatus thereby making the counterpart mobile station of each of said first and said second base stations selectively receive said current one of the control information signals and said following time duration inserted in said current one of the control information signals by the use of the control channel frequency in accordance with said previous time duration which is inserted in said previous one of the control information signals and which is previously and selectively received by the counterpart mobile station of each of said first and said second base stations.

4. A mobile station apparatus for use in each of first and second mobile stations of a mobile radio communication system comprising first and second base stations assigned to first and second service zones adjacent to each other, said first and said second mobile stations being present within said first and said second service zones as counterpart mobile stations of said first and said second base stations to communicate with said first and said second base stations, respectively, said first and said second base stations being assigned with a control channel frequency in common, each of said first and said second base stations comprising: control information transmitting means for intermittently transmitting control information signals by the use of said control channel frequency to the counterpart mobile station of each of said first and said second base stations with a time duration left between two adjacent ones of said control information signals; time duration determining means for randomly determining, as a following time duration, the time duration between a current one of said control information signals and a following one of said control information signals so that said following time duration randomly varies from a previous time duration which is previously determined between said current one of the control information signals and a previous one of said control information signals by said time duration determining means, said following one of the control information signals following said current one of the control information signals, said previous one of the control information signals preceding said current one of the control information signals; and transmission control means connected to said time duration determining means and said control information transmitting means for controlling said control information transmitting means so that said control information transmitting means transmits said current one of the control information signals by the use of said control channel frequency to the counterpart mobile station of each of said first and said second base stations with said following time duration inserted in said current one of the control information signals after said control information transmitting means transmits said previous one of the control information signals by the use of said control channel frequency to the counterpart mobile station of each of said first and said second base stations with said previous time duration inserted in said previous one of the control information signals; said mobile station apparatus for use in the counterpart mobile station of each of said first and said second base stations comprising:

control information receiving means for selectively receiving said current one of the control information signals and said following time duration inserted in said current one of the control information signals by the use of the control channel frequency in accordance with said previous time duration which is inserted in said previous one of the control information signals and which is previously and selectively received by said control information receiving means, said control information receiving means producing said current one of the control information signals except said following time duration after said control information receiving means produces said previous one of the control information signals except said previous following time duration; and operation control means connected to said control information receiving means for controlling operation of said mobile station apparatus in response to said current one of the control information signals except said following time duration after said operation control means controls operation of said mobile station apparatus in response to said previous one of the control information signals except said previous following time duration.

* * * * *